United States Patent
Kitajima et al.

(10) Patent No.: US 6,740,987 B2
(45) Date of Patent: May 25, 2004

(54) CONTROL DEVICE FOR HYBRID VEHICLE

(75) Inventors: Shinichi Kitajima, Utsunomiya (JP);
Atsushi Izumiura, Utsunomiya (JP);
Katsuhiro Kumagai, Utsunomiya (JP);
Asao Ukai, Utsunomiya (JP);
Shigetaka Kuroda, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 73 days.

(21) Appl. No.: 10/222,893

(22) Filed: Aug. 19, 2002

(65) Prior Publication Data

US 2003/0034653 A1 Feb. 20, 2003

(30) Foreign Application Priority Data

Aug. 20, 2001 (JP) ........................................ 2001-249357

(51) Int. Cl.$^7$ ................................................ B60L 11/04
(52) U.S. Cl. ..................... 290/40 C; 180/65.2; 318/376
(58) Field of Search ............................ 290/40 C, 40 D; 180/65.2, 65.8; 318/376, 139

(56) References Cited

U.S. PATENT DOCUMENTS

| | | | | |
|---|---|---|---|---|
| 6,290,012 B1 | * | 9/2001 | Matsubara et al. | ........ 180/65.4 |
| 6,314,346 B1 | * | 11/2001 | Kitajima et al. | .............. 701/22 |
| 6,318,487 B2 | * | 11/2001 | Yanase et al. | ............. 180/65.2 |
| 6,329,775 B1 | * | 12/2001 | Matsubara et al. | ......... 318/376 |
| 6,334,079 B1 | * | 12/2001 | Matsubara et al. | ........... 701/22 |
| 6,362,536 B1 | * | 3/2002 | Izumiura et al. | .......... 290/40 C |
| 6,366,059 B1 | * | 4/2002 | Wakashiro et al. | ........... 322/16 |
| 6,414,401 B1 | * | 7/2002 | Kuroda et al. | ............ 290/40 C |
| 6,424,053 B1 | * | 7/2002 | Wakashiro et al. | ....... 290/40 C |
| 6,488,345 B1 | * | 12/2002 | Woody et al. | .............. 303/152 |
| 6,570,265 B1 | * | 5/2003 | Shiraishi et al. | .......... 290/40 C |
| 6,570,266 B1 | * | 5/2003 | Wakashiro et al. | ....... 290/40 C |
| 6,621,175 B1 | * | 9/2003 | Kuroda et al. | ............ 290/40 D |

FOREIGN PATENT DOCUMENTS

JP        7-123509        5/1995

* cited by examiner

*Primary Examiner*—Nicholas Ponomarenko
(74) *Attorney, Agent, or Firm*—Arent Fox PLLC

(57) ABSTRACT

A control device for a hybrid vehicle provided with an engine and a motor as driving sources, and a storage battery device which stores regenerative energy obtained by output from the engine or by regenerative operation of the motor during deceleration of the vehicle. The control device includes: a vehicle speed detection unit which detects speed of the vehicle; a deceleration fuel cut determination unit which determines whether supply of fuel to the engine is stopped during deceleration of the vehicle; and a brake detection unit which detects operation of a brake, wherein regenerative braking is stopped when operation of the brake is detected by the brake detection unit if the vehicle speed detected by the vehicle speed detection unit is lower than a predetermined speed and if it is determined by the deceleration fuel cut determination unit that the supply of fuel to the engine is not stopped.

4 Claims, 5 Drawing Sheets

CONTROL DEVICE FOR HYBRID VEHICLE

BACKGROUND OF THE INVENTION

1. Field of the Invention

The present invention relates to a control device for hybrid vehicles. More specifically, the present invention relates to a control device for a hybrid vehicle which enables improvement in salability at low vehicle speed and low revolution range of the engine.

2. Description of Related Art

Hybrid vehicles provided with a motor as an auxiliary driving source for running the vehicle in addition to an engine have been conventionally known.

A parallel hybrid vehicle in which output from an engine is auxiliary assisted by a motor is a variation of the hybrid vehicle. In the parallel hybrid vehicle, output from the engine is auxiliary assisted by the motor when the vehicle is accelerated, and various controls, such as stop of fuel supply and charging of batteries using deceleration regenerative braking, are performed when the vehicle is decelerated so that the needs of the driver can be satisfied while maintaining remaining charge of the batteries (as disclosed in, for instance, Japanese Unexamined Patent Application, First Publication No. 7-123509).

In some of the above-mentioned hybrid vehicles, especially in vehicles provided with manual transmission (so called MT vehicles), regenerative braking is performed in accordance with the revolution number of the engine in a deceleration mode when deceleration fuel cut is not carried out at low vehicle speed and the accelerator is not pressed as in the case of, for instance, traveling on a curve at low speed.

However, when the vehicle enters a deceleration mode and the revolution number of the engine further decreases, and regenerative braking is stopped in order to prevent engine stall, the regenerative braking is carried out again since the load on the engine decreases by the amount corresponding to the stop of the regenerative braking and the revolution number of the engine increases.

Accordingly, hunting of the revolution number of the engine is caused by repeating stop and restart of the regenerative braking. In particular, when a large braking force is applied to the engine by means of a brake control and regenerative braking, such as for the case where the brake pedal is pressed, shock generated by stopping and restarting the regenerative braking increases, and this is not preferable in terms of salability.

SUMMARY OF THE INVENTION

Accordingly, an object of the present invention is to provide a control device for a hybrid vehicle which enables improvement in salability by stopping unnecessary regenerative braking by taking into account the driver's intention to stop the vehicle and by eliminating hunting of the revolution number of the engine within a low speed range.

In order to achieve the above object, the present invention provides a control device for a hybrid vehicle provided with an engine (for instance, an engine E in an embodiment described later) and a motor (for instance, a motor M in the embodiment described later) as driving sources, and a storage battery device (for instance, a battery 3 in the embodiment described later) which stores regenerative energy obtained by output from the engine or by regenerative operation of the motor during deceleration of the vehicle, the control device including: a vehicle speed detection unit (for instance, a vehicle speed sensor S1 in the embodiment described later) which detects speed of the vehicle; a deceleration fuel cut determination unit (for instance, a step S074 shown in FIG. 3 in the embodiment described later) which determines whether supply of fuel to the engine is stopped during deceleration of the vehicle; and a brake detection unit (for instance, a brake switch S4 in the embodiment described later) which detects operation of a brake, wherein regenerative braking is stopped (for instance, a cruise mode shown in step S077 in the embodiment described later) when operation of the brake is detected by the brake detection unit (for instance, "YES" in step S074C in the embodiment described later) if the vehicle speed detected by the vehicle speed detection unit is lower than a predetermined speed and if it is determined by the deceleration fuel cut determination unit that the supply of fuel to the engine is not stopped (for instance, "NO" in step S074 in the embodiment described later).

In accordance with another aspect of the invention, in the control device for a hybrid vehicle, the vehicle is further provided with a manual transmission (for instance, a manual transmission (MT) T in the embodiment described later).

According to the above control device for a hybrid vehicle, since the regenerative braking can be stopped by taking into account the driver's intention to stop when the brake pedal is applied if the vehicle speed is lower than a predetermined speed and it is not during a deceleration fuel cut state, it becomes possible to prevent hunting, in which increase and decrease of the engine revolution number is repeated as in the case where regenerative operation is continued, and hence the salability can be improved. Also, since the vehicle speed is low and the brake is applied, the degree of regenerative amount that can be obtained is small and no adverse effect is imparted on energy management.

The present invention also provides a control device for a hybrid vehicle provided with an engine (for instance, an engine E in an embodiment described later) and a motor (for instance, a motor M in the embodiment described later) as driving sources, and a storage battery device (for instance, a battery 3 in the embodiment described later) which stores regenerative energy obtained by output from the engine or by regenerative operation of the motor during deceleration of the vehicle, the control device including: a vehicle speed detection unit (for instance, a vehicle speed sensor S1 in the embodiment described later) which detects speed of the vehicle; a deceleration fuel cut determination unit (for instance, a step S074 shown in FIG. 3 in the embodiment described later) which determines whether supply of fuel to the engine is stopped during deceleration of the vehicle; a brake detection unit (for instance, a brake switch S4 in the embodiment described later) which detects operation of a brake, and a throttle opening degree detection unit (for instance, a throttle opening degree sensor S6 in the embodiment described later) which detects an opening degree of a throttle, wherein regenerative braking is carried out with a degree corresponding to a revolution number of the engine (as shown in, for instance, FIG. 5 which indicates setting of the regenerative amount in the deceleration mode in step S078, and step S104), if the opening degree of throttle detected by the throttle opening degree detection unit is smaller than a predetermined value (for instance, "NO" in step S074D in the embodiment described later), when the vehicle speed detected by the vehicle speed detection unit is lower than a predetermined speed, it is determined by the deceleration fuel cut determination unit that the supply of fuel to the engine is not stopped (for instance, "NO" in step S074 in the embodiment described later), and the operation of brake is not detected by the brake detection unit (for instance, "NO" in step S074C in the embodiment described later).

According to the above control device for a hybrid vehicle, it becomes possible to set an appropriate regenerative amount in accordance with the engine revolution number when a proper deceleration state is determined based on the throttle opening degree. Accordingly, regenerative operation can be smoothly performed.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of a particular preferred embodiment, set out below to enable one to build and use one particular implementation of the invention, is not intended to limit the enumerated claims, but to serve as a particular example thereof.

Figure 1:
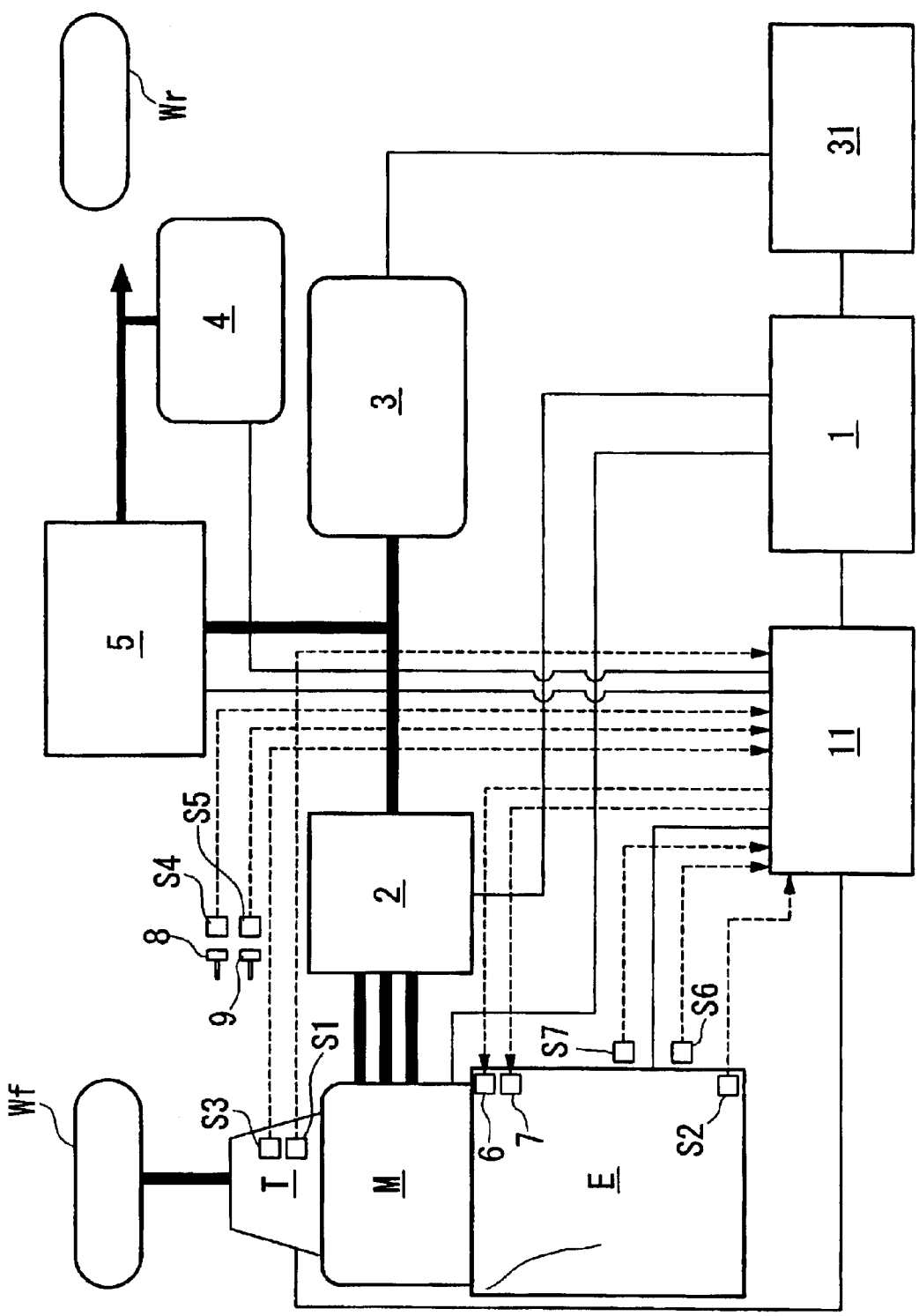
FIG. 1 is a schematic block diagram showing an overall structure of a hybrid vehicle used in an embodiment according to the present invention.

FIG. 1 is a schematic block diagram showing a parallel hybrid vehicle provided with a control device according to the first embodiment of the present invention. The parallel hybrid vehicle shown in FIG. 1 has a structure in which an engine E, a motor M, and a transmission T, which is a manual transmission MT, are connected in series. The driving force from both the engine E and the motor M are transmitted to front wheels Wf and Wf, which are driving wheels, via the manual transmission T. Also, when the driving force is transmitted to the motor M side from the front wheels Wf and Wf during deceleration of the hybrid vehicle, the motor M functions as a power generator to exert a regenerative braking force so as to collect the kinetic energy of the vehicle as an electric energy. Note that Wr shown in FIG. 1 indicates a rear wheel.

The actuation and regenerative operation of the motor M are carried out by a power drive unit (PDU) 2 which receives a control command from a motor ECU1. A high voltage type battery (storage battery device) 3, which supplies and receives an electric energy from the motor M, is connected to the power drive unit 2. The battery 3 is formed by, for instance, a plurality of modules connected in series, and in each of the modules, a plurality of cells are connected in series. A 12-volt auxiliary battery 4 for driving various auxiliary machineries is mounted on the hybrid vehicle, and the auxiliary battery 4 is connected to the battery 3 via a downverter 5. The downverter 5, which is controlled by a FIECU 11, charges the auxiliary battery 4 by decreasing the voltage of the battery 3.

The FIECU 11 controls, in addition to the motor ECU 1 and the downverter 5, operation of a fuel supply amount control unit 6, which controls the amount of fuel supplied to the engine E, of a starter motor, and of ignition timing. For this reason signals are input to the FIECU 11 from a speed sensor (vehicle speed detection unit) S1 which detects the vehicle's speed V based on the revolution number of a driving shaft of the transmission T, an engine revolution number sensor S2 which detects the revolution number of the engine NE, a shift position sensor S3 which detects a shift position of the transmission T, a brake switch (a brake detection unit) S4 which detects operation of a brake pedal 8, a clutch switch S5 which detects operation of a clutch pedal 9, a throttle sensor (a throttle opening degree detection unit) S6 which detects an opening degree of a throttle TH, and an inlet pipe negative pressure sensor S7 which detects inlet pipe negative pressure PBGA. Also, in FIG. 1, the numeral 31 indicates a battery ECU which protects the battery 3 and calculates the remaining charge SOC of the battery 3.

MA (motor) basic mode:

Next, the MA (motor) basic mode which determines a mode in which the above-mentioned motor M is operated will be explained based on the flowcharts shown in FIGS. 2 and 3. Note that this process is periodically repeated at a predetermined interval.

The MA (motor) basic mode includes "idling mode", "idling stop mode", "deceleration mode", "cruising mode", and "acceleration mode". In the idling mode, supply of fuel is restarted after a fuel cut and the engine E is maintained in an idling state. In the idling stop mode, the engine E is stopped under certain conditions when, for instance, the vehicle is stopped. Also, in the deceleration mode, regenerative braking is carried out by the motor M, and in the acceleration mode, the drive of the engine E is assisted by the motor M. In the cruising mode, the motor M is not actuated and the vehicle is driven by the force from the engine E. Accordingly, regenerative braking is not carried out in the cruising mode.

Figure 2:
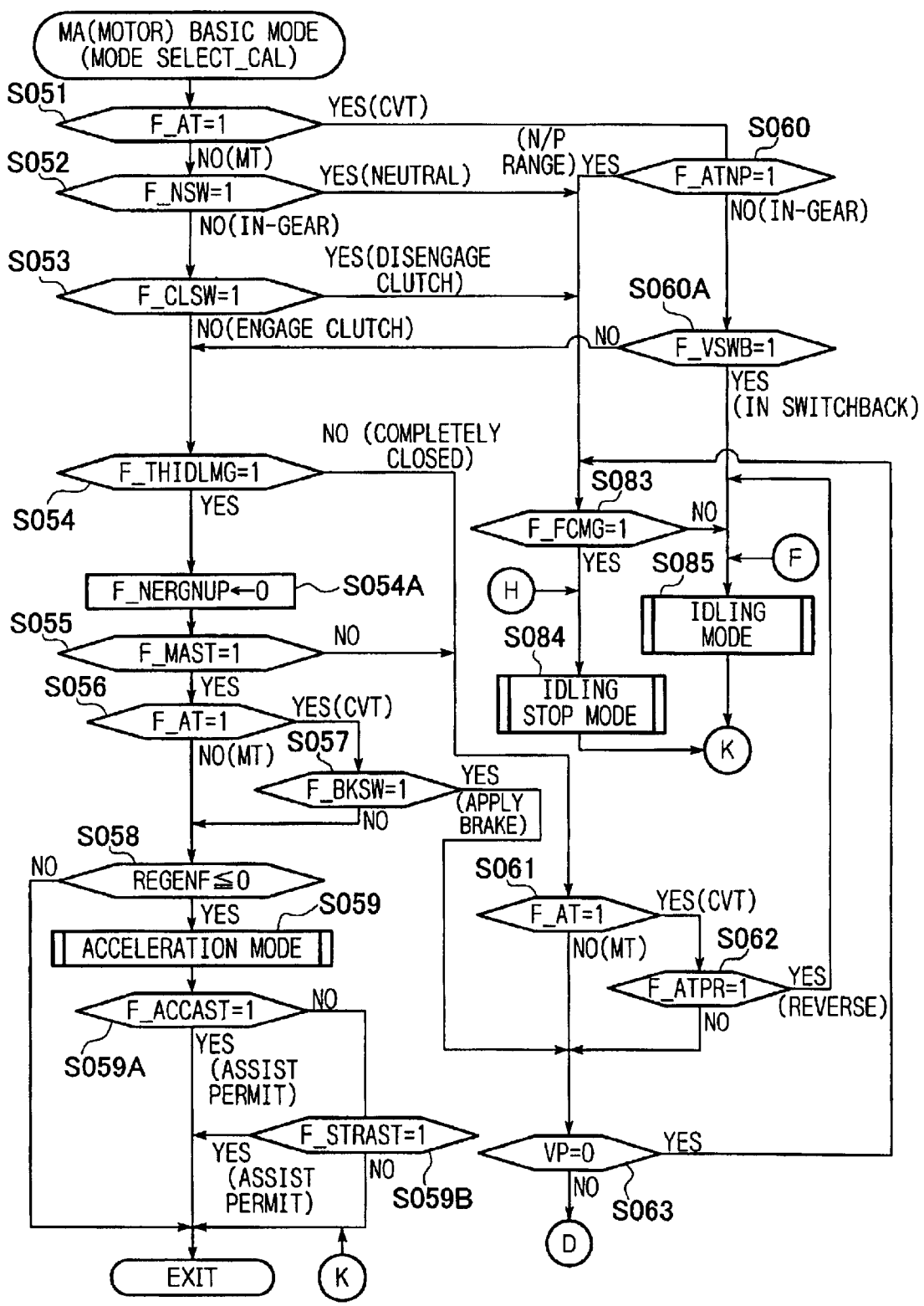
FIG. 2 is a flowchart showing a MA (motor) basic mode according to an embodiment of the present invention.
Figure 3:
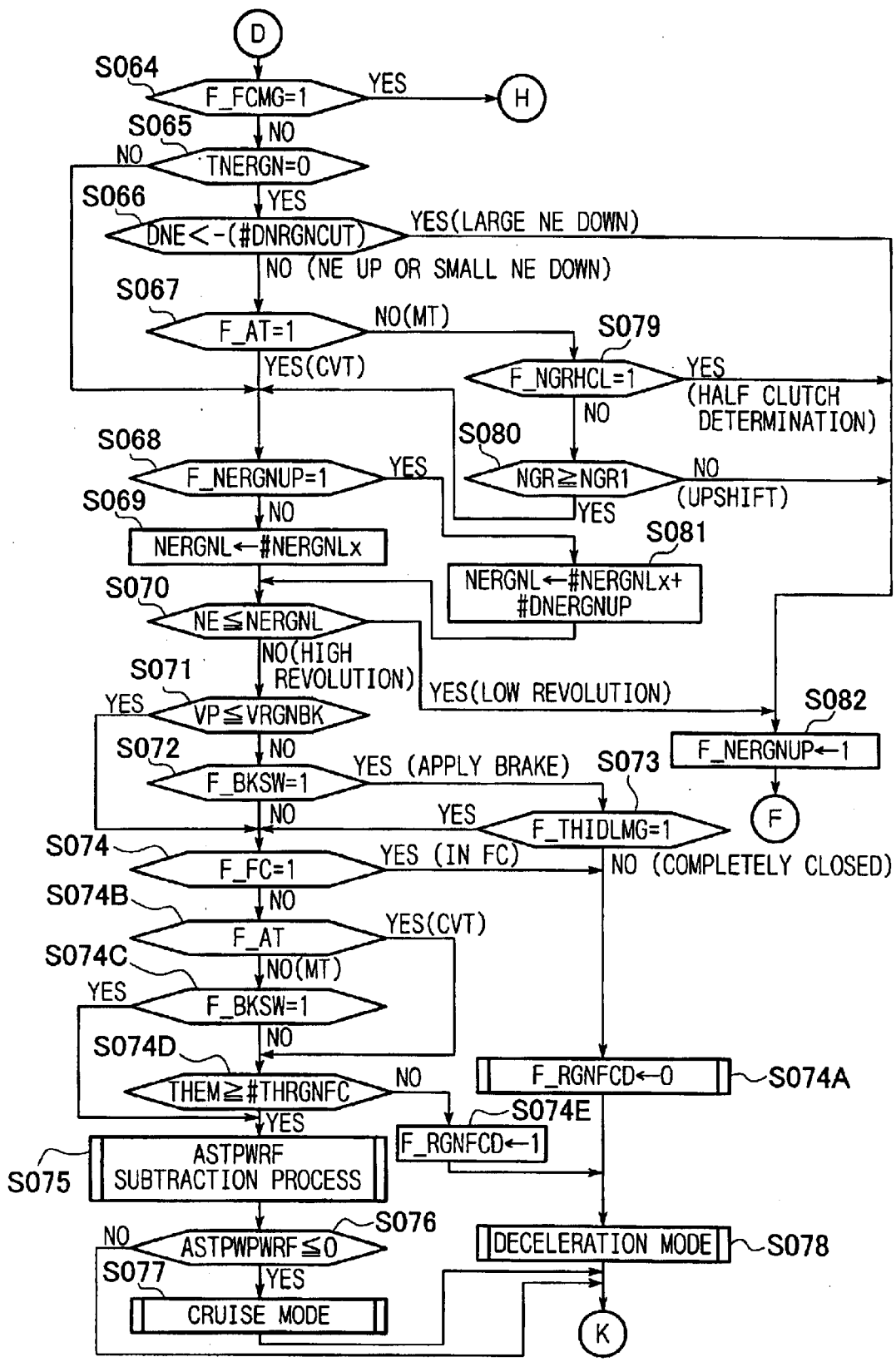
FIG. 3 is also a flowchart showing a MA (motor) basic mode according to an embodiment of the present invention.

Note that although the hybrid vehicle used in this embodiment for explanation purposes is a MT (manual transmission) vehicle, the flowcharts shown in FIGS. 2 and 3 may also apply to a CVT vehicle.

In step S051 shown in FIG. 2, it is determined whether or not a MT/CVT determination flag F_AT is "1". If the determination result is "YES" (i.e., CVT vehicle), the process proceeds to step S060, and if the determination result is "NO" (i.e., MT vehicle), then the process proceeds to step S052.

In step S060, it is determined whether or not an in-gear determination flag F_ATNP is "1". If the determination result is "YES" (i.e., N, P range), the process proceeds to step S083, and if the determination result is "NO" (i.e., in-gear), the process proceeds to step S060A.

In step S060A, it is determined whether or not a switch-back flag F_VSWB is "1" in order to check if it is in a switchback state (i.e., the shift position cannot be specified since the shift lever is being operated). If the determination result is "YES" (i.e., in the switchback state), the process proceeds to step S085, and the mode is switched over to the idling mode and the control is terminated. In the idling mode, the engine E is maintained in an idling state. If the determination result is "NO" (i.e., not in the switchback state), on the other hand, the process proceeds to step S054.

In step S083, it is determined whether or not an engine stop control operation flag F_FCMG is "1". If the determination result in step S083 is "NO", the process proceeds to the idling mode in step S085 and the control is terminated, and if the determination result in step S083 is "YES", then the process proceeds to step S084 to switch over to the idling stop mode and the control is terminated. In the idling stop mode, the engine is stopped under certain conditions when, for instance, the vehicle is stopped.

In step S052, it is determined whether or not a neutral position determination flag F_NSW is "1". If the determination result is "YES" (i.e., neutral position), the process proceeds to step S083, and if the determination result is "NO" (i.e., in-gear), then the process proceeds to step S053.

In step S053, it is determined whether or not a clutch engage determination flag F_CLSW is "1". If the determination result is "YES" (i.e., clutch disengaged), the process proceeds to step S083, and if the determination result is "NO" (i.e., clutch engaged), then the process proceeds to step S054.

In step S054, it is determined whether or not an IDLE determination flag F_THIDLMG is "1". If the determination result is "NO" (i.e., completely closed), the process proceeds to step S061, and if the determination result is "YES" (i.e., not completely closed), then the process proceeds to step S054A.

In step S054A, "0" is set for an engine revolution number increase flag F_NERGNUP used for half-clutch determination, and the process proceeds to step S055.

In step S055, it is determined whether or not a motor assist determination flag F_MAST is "1". This flag is used to determine if the engine E is assisted by the motor M. If the flag is "1", it means there is an assisting demand, and if the flag is "0", it means there is no assisting demand. Note that the motor assist determination flag is set by an assist trigger determination process which is not shown in the figure.

In the determination result in step S055 is "NO", the process proceeds to step S061, and if the determination result in step S055 is "YES", the process proceeds to step S056.

In step S056, it is determined whether or not a MT/CVT determination flag F_AT is "1". If the determination result is "YES" (i.e., CVT vehicle), the process proceeds to step S057, and if the determination result is "NO" (i.e., MT vehicle), the process proceeds to step S058.

In step S057, it is determined whether or not a brake ON determination flag F_BKSW is "1". If the determination result is "YES" (i.e., brake ON), the process proceeds to step S063, and if the determination result is "NO" (i.e., brake OFF), the process proceeds to step S058.

In step S058, it is determined whether a final charge command value REGENF is equal to or less than "0". If the determination result is "YES", the process proceeds to the acceleration mode in step S059. In the acceleration mode, the drive of the engine E is assisted by the motor M, and the process proceeds to step S059A. If the determination result in step S058 is "NO", the control is terminated.

In step S059A, it is determined whether or not an assist permission flag F_ACCAST is "1". If the determination result is "YES", the control is terminated, and if the determination result is "NO", then the process proceeds to step S059B.

In step S059B, it is determined whether or not a start assist permission flag F_STRAST is "1". If the determination result is "YES", and if the determination result is "NO", the control is terminated.

In step S061, it is determined whether or not the MT/CVT determination flag F_AT is "1". If the determination result is "NO" (i.e., MT vehicle), the process proceeds to step S063, and if the determination result is "YES" (i.e., CVT vehicle), the process proceeds to step S062.

In step S062, it is determined whether or not a reverse position determination flag F_ATPR is "1". If the determination result is "YES" (i.e., reverse position), the process proceeds to step S085, and if the determination result is "NO" (i.e., other than the reverse position), the process proceeds to step S063.

In step S063, it is determined whether or not a vehicle speed VP is "0". If the determination result is "YES", the process proceeds to step S083, and if the determination result is "NO", the process proceeds to step S064.

In step S064, it is determined whether or not an engine stop control operation flag F_FCMG is "1". If the determination result is "NO", the process proceeds to step S065, and if the determination result is "YES", the process proceeds to step S084.

In step S065, it is determined whether or not a shift change compulsive REGEN cancel determination process delay timer TNERGN is "0". If the determination result is "YES", the process proceeds to step S066, and if the determination result is "NO", the process proceeds to step S068.

In step S066, it is determined whether the rate of change DNE of the engine revolution number is smaller than the minus value of a REGEN excluding determination engine revolution number #DNRGNCUT by the DNE. In this embodiment, the REGEN excluding determination engine revolution number #DNRGNCUT by the DNE means a rate of change DNE of the engine revolution number NE, which becomes a criterion for determining whether a reduction in output is carried out in accordance with the rate of change DNE of the engine revolution number.

As a result of the determination in step S066, if it is determined that the rate of decrease in the engine revolution number NE is large (i.e., "YES" in step S066), the process proceeds to step S082. In step S082, "1" is set for the engine revolution number increase flag F_NERGNUP used for half-clutch determination, and the process proceeds to step S085.

As a result of the determination in step S066, if it is determined that the engine revolution number NE increases or the rate of decrease in the engine revolution number is small (i.e., "NO" in step S066), the process proceeds to step S067.

In step S067, it is determined whether or not the MT/CVT determination flag F_AT is "1". If the determination result is "NO" (i.e., MT vehicle), the process proceeds to step S079, and if the determination result is "YES" (i.e., CVT vehicle), the process proceeds to step S068.

In step S079, it is determined whether or not a half-clutch determination flag F_NGRHCL is "1". As a result of the determination, if a half-clutch determination is made (i.e., "YES" in step S079), the process proceeds to step S082. Also, if the half-clutch determination is not made (i.e., "NO" in step S079), then the process proceeds to step S080.

In step S080, a previous gear position NGR is compared with a current gear position NGR1, and it is determined whether the gear has been upshifted.

As a result of the determination in step S080, if the gear position is upshifted (i.e., "NO" in step S080), the process proceeds to step S082. As a result of the determination in step S080, if the gear position is not upshifted (i.e., "YES" in step S080), the process proceeds to step S068.

In step S068, it is determined whether or not the engine revolution number increase flag F_NERGNUP used for half-clutch determination is "1". As a result of the determination, if it is required to increase the engine revolution number upon half-clutch determination and the flag is set (=1) (i.e., "YES" in step S68), the process proceeds to step S081, and an increase revolution number #DNERGNUP for preventing hunting is added to a lower limit engine revolution number for charging, #NERGNLx, which is set for each gear, and the value obtained by the addition is set for a lower limit engine revolution number for charging, NERGNL. Then, the process proceeds to step S070.

As a result of the determination in step S068, if it is not required to increase the engine revolution number upon half-clutch determination and the flag is reset (=0) (i.e., "NO" in step S68), the process proceeds to step S069, and the lower limit engine revolution number for charging, #NERGNLx, which is set for each gear, is set for the lower limit engine revolution number for charging, NERGNL. Then, the process proceeds to step S070.

In step S070, it is determined whether the engine revolution number NE is equal to or lower than the lower limit engine revolution number NERGNL. As a result of the determination, if it is determined to be low revolution (i.e., NE≦NERGNL, "YES" in step S070), the process proceeds to step S082. On the other hand, as a result of the determination, if it is determined to be high revolution, (i.e., NE>NERGNL, "NO" in step S070), then the process proceeds to step S071.

In step S071, it is determined whether the vehicle speed VP is equal to or lower than a deceleration mode brake determination lower limit vehicle speed #VRGNBK (low vehicle speed). Note that the deceleration mode brake determination lower limit vehicle speed #VRGNBK is a value having hysteresis As a result of the determination, if it is determined that vehicle speed VP≦deceleration mode brake determination lower limit vehicle speed #VRGNBK (i.e., "YES" in step S071), the process proceeds to step S074. On the other hand, as a result of the determination in step S071, if it is determined that vehicle speed VP>deceleration mode brake determination lower limit vehicle speed #VRGNBK (i.e., "NO" in step S071), the process proceeds to step S072. The above-mentioned deceleration mode brake determination lower limit vehicle speed #VRGNBK is, for example, speed in the range of about 24–26 km/h.

In step S072, it is determined whether or not a brake ON determination flag F_BKSW is equal to "1". If the determination result is "YES", the process proceeds to step S073. On the other hand, if the determination result is "NO", then the process proceeds to step S074.

In step S73, it is determined whether or not the IDLE determination flag F_THIDLMG is "1". If the determination result is "NO" (i.e., throttle is completely closed), "0" is set for a fuel cut delay regeneration flag F_RGNFCD in step S074A, and the process proceeds to the deceleration mode in step S078 and the control is terminated. Here, the term the fuel cut delay regenerative operation means a regenerative process which is carried out for imparting a suitable deceleration feeling for the passengers during a certain period before entering the fuel cut process, and the fuel cut delay regeneration flag F_RGNFCD becomes "1" when this process is being carried out, and it becomes "0" when the process is not being carried out. Note that regenerative braking by the motor M is performed in the deceleration mode.

In step S074, it is determined whether or not the fuel cut flag F_FC is "1". This flag is a fuel cut determination flag the value of which becomes "1" and performs a fuel cut when regenerative operation by the motor M is carried out in the deceleration mode in step S078. As a result of the determination in step S074, if it is determined to be during a deceleration fuel cut process (i.e., "YES" in step S074), the process proceeds to step S074A. On the other hand, if it is determined that it is not during the deceleration fuel cut process (i.e., "NO" in step S074), the process proceeds to step S074B. The above-mentioned step S074 forms a fuel cut determination means (unit).

In step S074B, it is determined whether or not the MT/CVT determination flag F_AT is "1". If the determination result is "NO" (i.e., MT vehicle), the process proceeds to step S074C, and if the determination result is "YES" (i.e., CVT vehicle), the process proceeds to step S074D.

In step S074C, it is determined whether or not the brake ON determination flag F_BKSW is "1". If the determination result is "YES", the process proceeds to step S075, and if the determination result is "NO", the process proceeds to step S074D.

In step S074D, it is determined whether a current value of the throttle opening degree THEM is equal to or greater than a deceleration mode throttle determination value without fuel cut, #THRGNFC (a predetermined value). As a result of the determination, it is determined whether to enter the deceleration mode, i.e., selection of the deceleration mode or the cruise mode is made. If the determination result is "YES", the process proceeds to step S075, and if the determination result is "NO" (i.e., THEM is smaller), the process proceeds to step S074E. Note that the deceleration mode throttle determination value without fuel cut, #THRGNFC, is a value having hysteresis. In step S074E, "1" is set for the fuel cut delay regeneration flag F_RGNFCD, and the process proceeds to step S078.

In step S075, a subtraction process for a final assist command value ASTPWRF is carried out, and the process proceeds to step S076.

In step S076, it is determined whether the final assist command value ASTPWRF is equal to or lower than "0". If the determination result is "YES", the process proceeds to the cruise mode in step S077, and the control is terminated. In the cruise mode, the motor M is not driven, and the vehicle runs by means of the driving force from the engine E. Accordingly, regenerative operation by the motor M is not carried out. If the determination result in step S076 is "NO", then the control is terminated.

Figure 4:
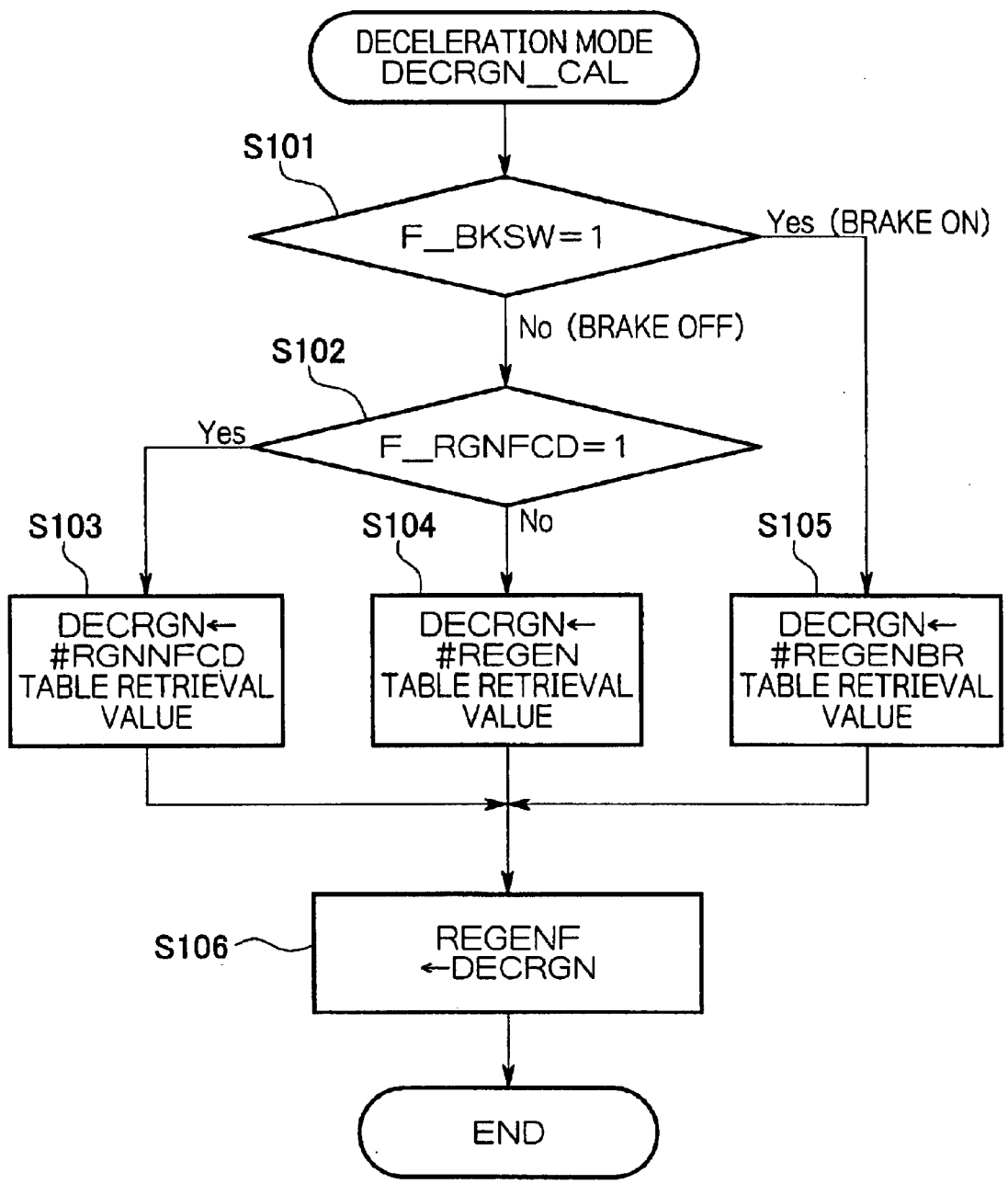
FIG. 4 is a flowchart of deceleration mode according to an embodiment of the present invention.

Deceleration Mode:

Next, the deceleration mode will be explained with reference to the flowchart shown in FIG. 4. The deceleration mode is a process for setting a regenerative amount (final charging command value) during deceleration of a MT vehicle. Note that the process is repeated at a predetermined interval.

In step S101, it is determined whether or not the brake ON determination flag F_BKSW is "1". If the determination result is "YES", then the process proceeds to step S105, and if the determination result is "NO", the process proceeds to step S102.

In step S105, a #REGENBR table retrieval value is set for a deceleration regenerative operation value DECRGN, and the process proceeds to step S106. Here, the #REGENBR table is a table in which the regenerative amount increases in accordance with the increase in the engine revolution number, and the table is changed for each gear. Note that the table retrieval value #REGENBR is set to be larger than a table retrieval value #REGEN at brake OFF, which will be described later.

In step S106, the deceleration regenerative operation value DECRGN is substituted for the final charging command value REGENF, and the process is terminated.

In step S102, it is determined whether or not the fuel cut delay regeneration flag F_RGNFCD is "1". If the determination result is "YES", then the process proceeds to step S103, and if the determination result is "NO", then the process proceeds to step S104.

In step S103, a #RGNNFCD table retrieval value is set for the deceleration regenerative operation value DECRGN, and the process proceeds to step S106. Here, the #RGNNFCD table is a table in which the regenerative amount is set to increase in accordance with the increase in the vehicle speed.

Figure 5:
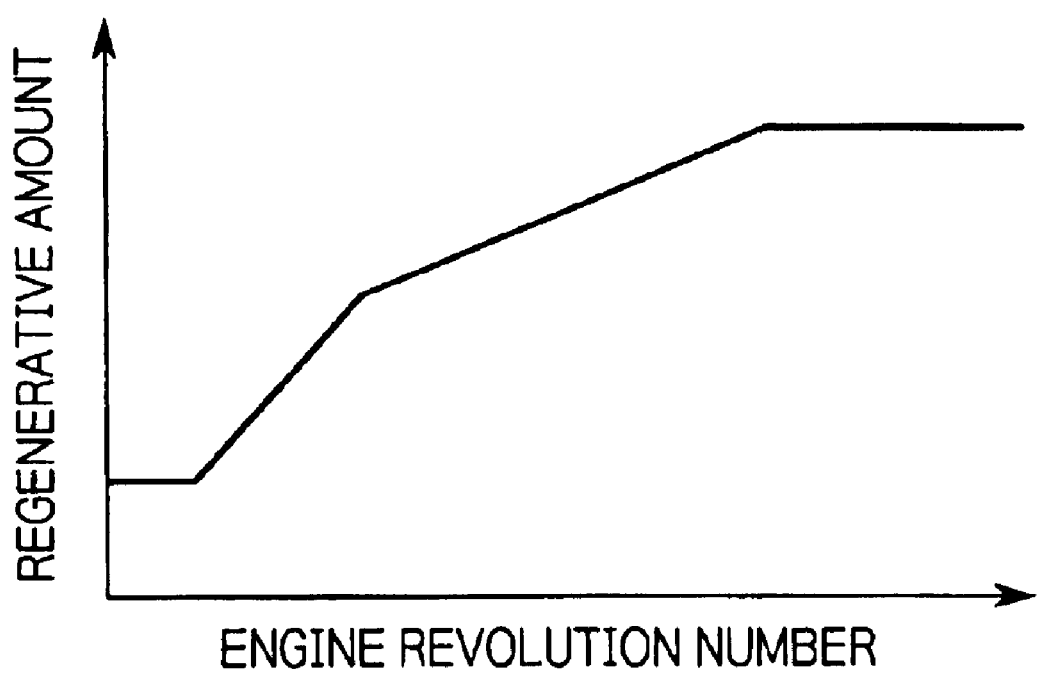
FIG. 5 is a graph showing the relationship between engine revolution numbers and regenerative amount.

In step S104, the #REGEN table retrieval value is set for the deceleration regenerative operation value DECRGN, and the process proceeds to step S106. Here, as shown in FIG. 5, the #REGEN table is a table in which the regenerative amount (vertical axis) is set to increase in accordance with the increase in the engine revolution number (horizontal axis), and the table is changed for each gear. In this table, the regenerative amount does not change when the regenerative amount is zero even if the engine revolution number increases at the low engine revolution number side. Also, the engine revolution number at the point where the regenerative amount starts to increase with respect to the engine revolution number indicates the deceleration mode throttle determination value without fuel cut, #THRGNFC, at step S074D shown in FIG. 3. Note that the table retrieval value #REGEN is set to be smaller than the table retrieval value #REGENBR during the above-mentioned brake ON period.

In this embodiment, the regenerative amount gradually increases or gradually decreases since shock will be generated if deceleration regenerative braking is suddenly applied when regenerative operation is started, or if the deceleration regenerative braking is suddenly stopped when the regenerative operation is stopped. Note that as for a CTV vehicle, the deceleration regenerative operation value is set based on the vehicle speed in the above-mentioned steps S104 and S105.

In the embodiment described above, stable transfer to a vehicle stop state can be realized since the operation of the brake is determined prior to determine the throttle opening degree in step S074D shown in FIG. 3 when the vehicle speed is lower than a predetermined value (i.e., "YES" in step S071) and supply of fuel is not cut during deceleration (i.e., "NO" in step S074), and since unnecessary regenerative braking can be stopped by transferring to a cruise mode regardless of the determination result of the throttle opening degree in step S074D by taking into account driver's intention to stop the vehicle in the brake operation period (i.e., "YES" in step S074C). Accordingly, it becomes possible to improve the salability by preventing hunting in which increase and decrease of the engine revolution number is repeated when the regenerative operation is continuously carried out. Also, no adverse effects are given in terms of energy management since the amount of regenerative braking is small due to factors that the vehicle is run at low speed, and the brake pedal is applied.

In particular, since it is difficult to estimate the braking force by the brake at low vehicle speed, which differs significantly by drivers, the revolution number of the engine may be significantly changed if regenerative braking is added. However, the change in the revolution number of the engine can be prevented to a large extent by terminating the regenerative braking.

Also, when the brake is not operated, since it can be assumed that the driver has no intention to stop, control which meets the driver's intention can be performed by carrying out the regenerative operation. In this case, smooth regenerative operation can be performed since a proper regenerative amount is set in accordance with the revolution number of the engine (in step S104) when the throttle opening degree is smaller than the deceleration mode throttle determination value without fuel cut, #THRGNF, and enters the deceleration mode (i.e., "NO" in step S074D).

Moreover, in the above case, since the brake is not operated, only a braking force due to smaller regenerative braking as compared with the case where the brake is operated is applied. Accordingly, the degree of shock the driver can feel is small and the salability is not deteriorated.

Having thus described an exemplary embodiment of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only: the invention is limited and defined only by the following claims and equivalents thereto.

What is claimed is:

1. A control device for a hybrid vehicle provided with an engine and a motor as driving sources, and a storage battery device which stores regenerative energy obtained by output from the engine or by regenerative operation of the motor during deceleration of the vehicle, the control device comprising:

a vehicle speed detection unit which detects speed of the vehicle;

a deceleration fuel cut determination unit which determines whether supply of fuel to the engine is stopped during deceleration of the vehicle; and a brake detection unit which detects operation of a brake, wherein regenerative braking is stopped when operation of the brake is detected by the brake detection unit if the vehicle speed detected by the vehicle speed detection unit is lower than a predetermined speed and if it is determined by the deceleration fuel cut determination unit that the supply of fuel to the engine is not stopped.

2. A control device for a hybrid vehicle according to claim 1, wherein the vehicle is further provided with a manual transmission.

3. A control device for a hybrid vehicle provided with an engine and a motor as driving sources, and a storage battery device which stores regenerative energy obtained by output from the engine or by regenerative operation of the motor during deceleration of the vehicle, the control device comprising:

a vehicle speed detection unit which detects speed of the vehicle;

a deceleration fuel cut determination unit which determines whether supply of fuel to the engine is stopped during deceleration of the vehicle;

a brake detection unit which detects operation of a brake, and a throttle opening degree detection unit which detects an opening degree of a throttle, wherein regenerative braking is carried out with a degree corresponding to a revolution number of the engine, if the opening degree of the throttle detected by the throttle opening degree detection unit is smaller than a predetermined value, when the vehicle speed detected by the vehicle speed detection unit is lower than a predetermined speed, it is determined by the deceleration fuel cut determination unit that the supply of fuel to the engine is not stopped, and the operation of the brake is not detected by the brake detection unit.

4. A control device for a hybrid vehicle according to claim 3, wherein the vehicle is further provided with a manual transmission.

* * * * *